Figure 1:
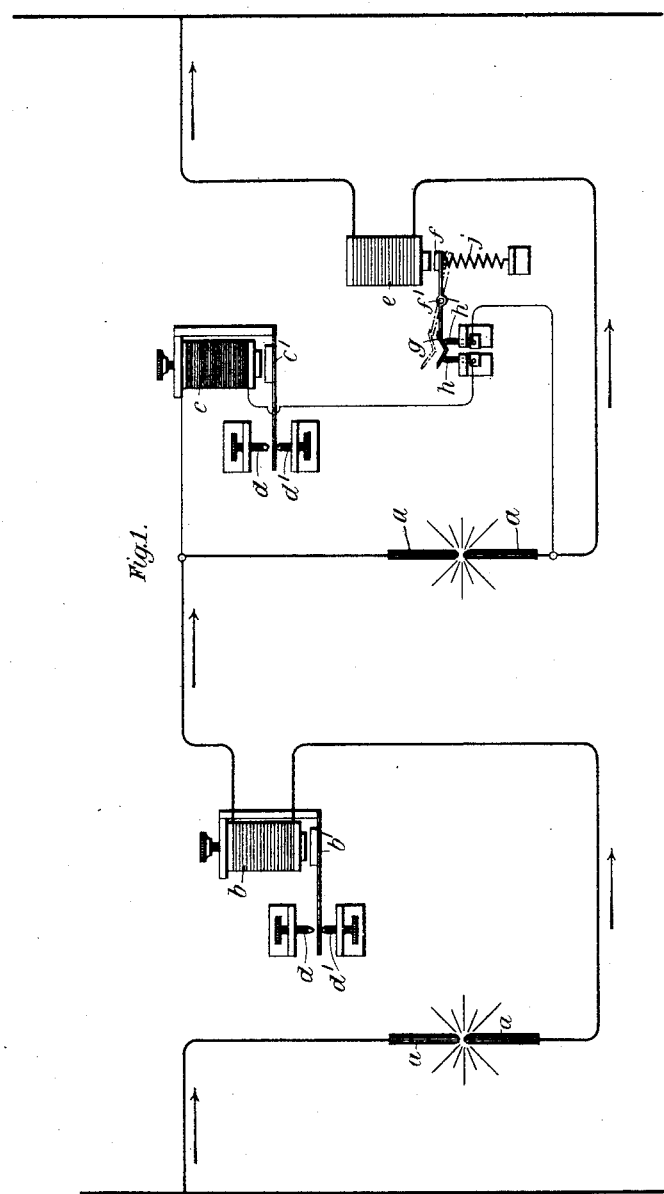

(No Model.) 9 Sheets—Sheet 1.

A. L. SHEPARD.
ELECTRIC ARC LAMP.

No. 474,266. Patented May 3, 1892.

Witnesses:
J. A. Rutherford.
Robert Everett.

Inventor:
Alfred L. Shepard
By James L. Norris.
Attorney.

(No Model.) 9 Sheets—Sheet 2.
A. L. SHEPARD.
ELECTRIC ARC LAMP.
No. 474,266. Fig. 2. Patented May 3, 1892.
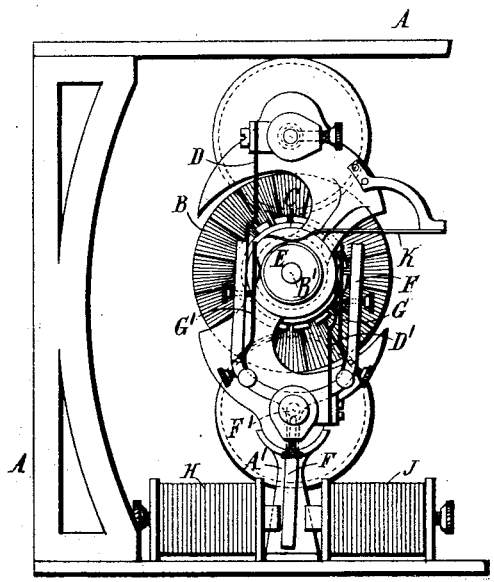
Fig. 3.
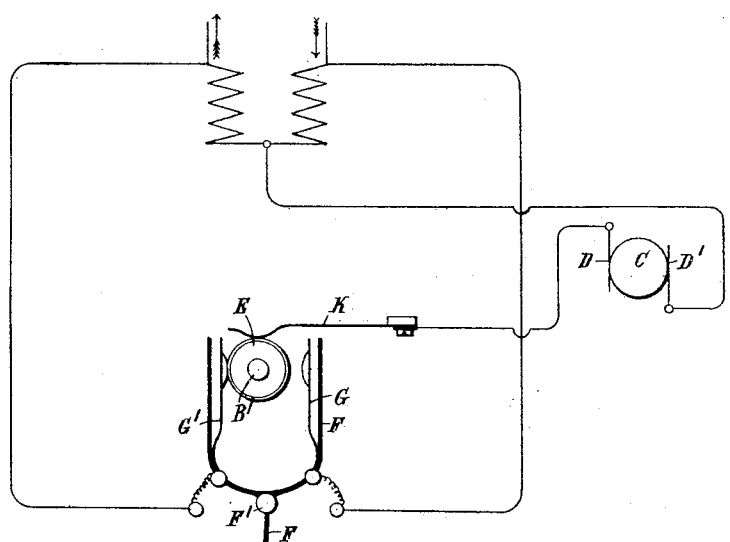
Witnesses:
J. A. Rutherford
Robert Everett
Inventor:
Alfred L. Shepard
By James L. Norris.
Attorney (No Model.) 9 Sheets—Sheet 5.

A. L. SHEPARD.
ELECTRIC ARC LAMP.

No. 474,266. Patented May 3, 1892.

Witnesses:
J. A. Rutherford
Robert Corrett

Inventor:
Alfred L. Shepard
By James L. Norris,
Attorney (No Model.)  9 Sheets—Sheet 6.

A. L. SHEPARD.
ELECTRIC ARC LAMP.

No. 474,266. Patented May 3, 1892.

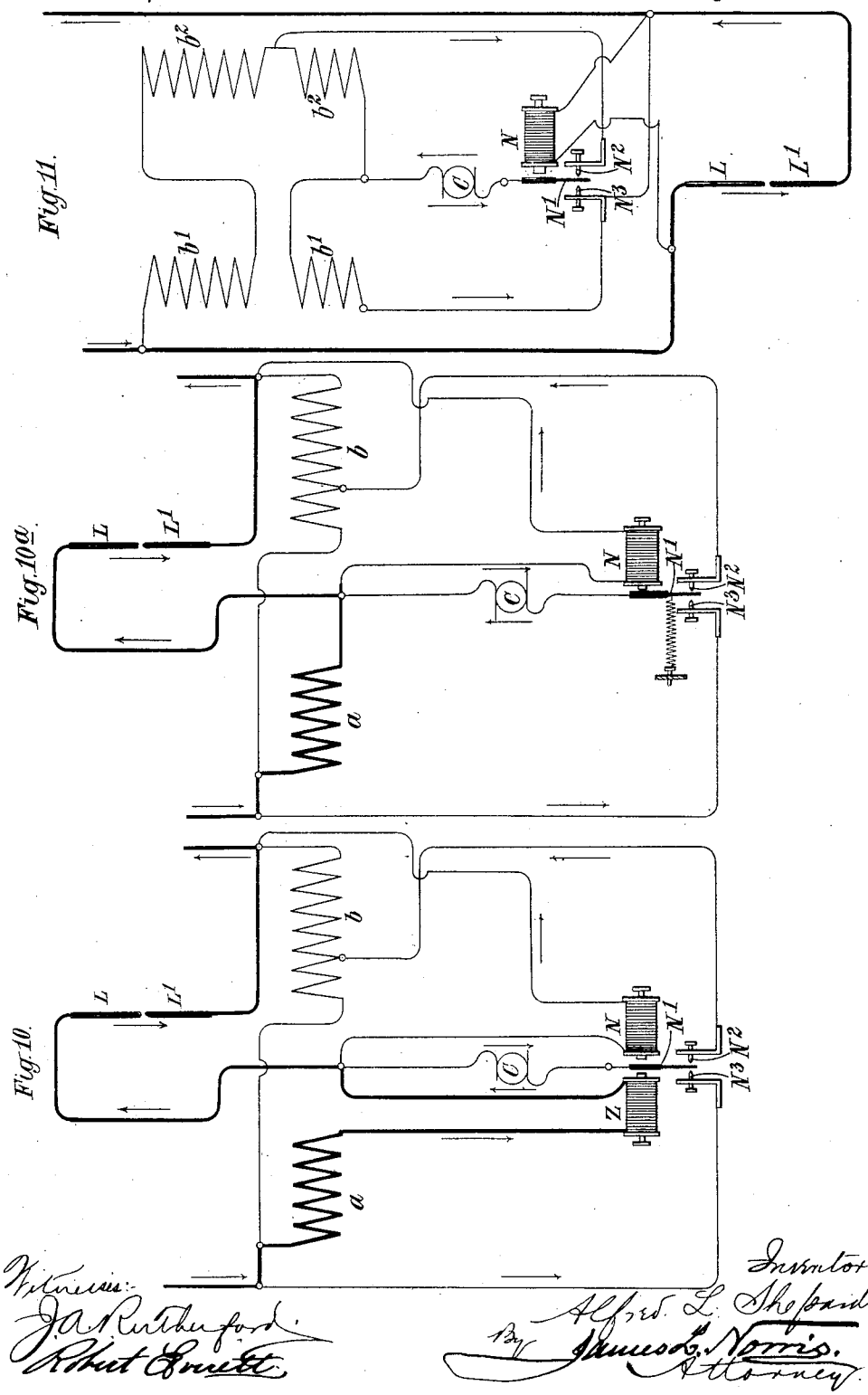

(No Model.) 9 Sheets—Sheet 8.

A. L. SHEPARD.
ELECTRIC ARC LAMP.

No. 474,266. Patented May 3, 1892.

(No Model.) 9 Sheets—Sheet 9.

A. L. SHEPARD.
ELECTRIC ARC LAMP.

No. 474,266. Patented May 3, 1892.

UNITED STATES PATENT OFFICE.

ALFRED LYSTER SHEPARD, OF LONDON, ENGLAND.

ELECTRIC-ARC LAMP.

SPECIFICATION forming part of Letters Patent No. 474,266, dated May 3, 1892.

Application filed August 6, 1891. Serial No. 401,910. (No model.)

*To all whom it may concern:*

Be it known that I, ALFRED LYSTER SHEPARD, electrical engineer, a subject of the Queen of Great Britain, and a resident of London, England, have invented certain new and useful Improvements Relating to Electric Lamps and to Apparatus Connected Therewith, of which the following is a specification, reference being had to the accompanying drawings.

My invention relates to electric lamps and to apparatus connected therewith.

One part of my said invention is applicable to arc lamps which are arranged in multiple series—that is to say, in parallel groups of two or more in series—and this part of my said invention is especially useful on circuits in which the potential is liable to drop to a pressure so low as to be insufficient for the proper working of the lamps as heretofore arranged and regulated. An important feature of this part of my said invention consists in providing, in combination with one or more lamps whose regulation is controlled by coils shunted on their own arcs, a lamp whose regulation is controlled by a coil or coils in series with its arcs, so that this lamp, while keeping the current constant, will take up or absorb in its arc any excess of potential or will compensate for diminution of potential below the normal. The remainder of the lamps are thus protected against any injurious effects of variation of potential.

Another part of my said invention is designed to provide improved means for switching the said shunt coil or coils out of circuit when the carbons of the corresponding lamp or lamps are consumed. It often happens in working a number of lamps in parallel or in multiple series that the attendant forgets to switch off the the lamps when the carbons are burned out, thus causing damage to the fine-wire coil of the relay (when a shunt-coil is used for effecting or controlling the regulation) and also causing waste of the current. To guard against such accidents or neglect I provide an electro-magnet which is placed in the lamp-circuit and which by attracting its armature maintains electrical connection between two contacts, and thereby energizes the coil in the shunt-circuit so long as the current flows through the lamp. When, however, the carbons are sufficiently burned and the further feeding of the same is prevented by a suitable stop, the main current through the lamp being interrupted, the said electro-magnet will release its armature and the shunt-circuit will thus be interrupted.

Another part of my said invention relates to that class of arc lamps known as "motor-lamps"—that is to say, lamps in which the operation of the carbons is effected by means of an electric motor, the working of the motor being controlled by a relay which operates two or more contact-points, some of which are fixed and some movable—as, for instance, one or more movable tongues working in combination with fixed points of contact. The said contact-points conduct a current to the motor and cause it to move the carbons according to the requirements of the lamp. In order to save the above-mentioned contact-points from being burned and worn away by continual sparking on the same spot and to keep them clean, I so construct them and arrange them relatively to each other that the contact-points which before were stationary are now caused to move or revolve as the motor works, thereby continually presenting fresh surfaces to the above-mentioned movable tongue or tongues. The rubbing action which takes place between the points of contact keeps them clean, thus minimizing the wearing of the platinum or other contacts, and consequently increasing the stability and quality of the light furnished by the lamps.

My said invention moreover comprises other improvements more particularly designed for arc lamps of this description for working with large currents, such as search-lights for military and other purposes.

In the accompanying drawings I have shown how my said invention may be conveniently and advantageously carried into practice.

Figure 4:
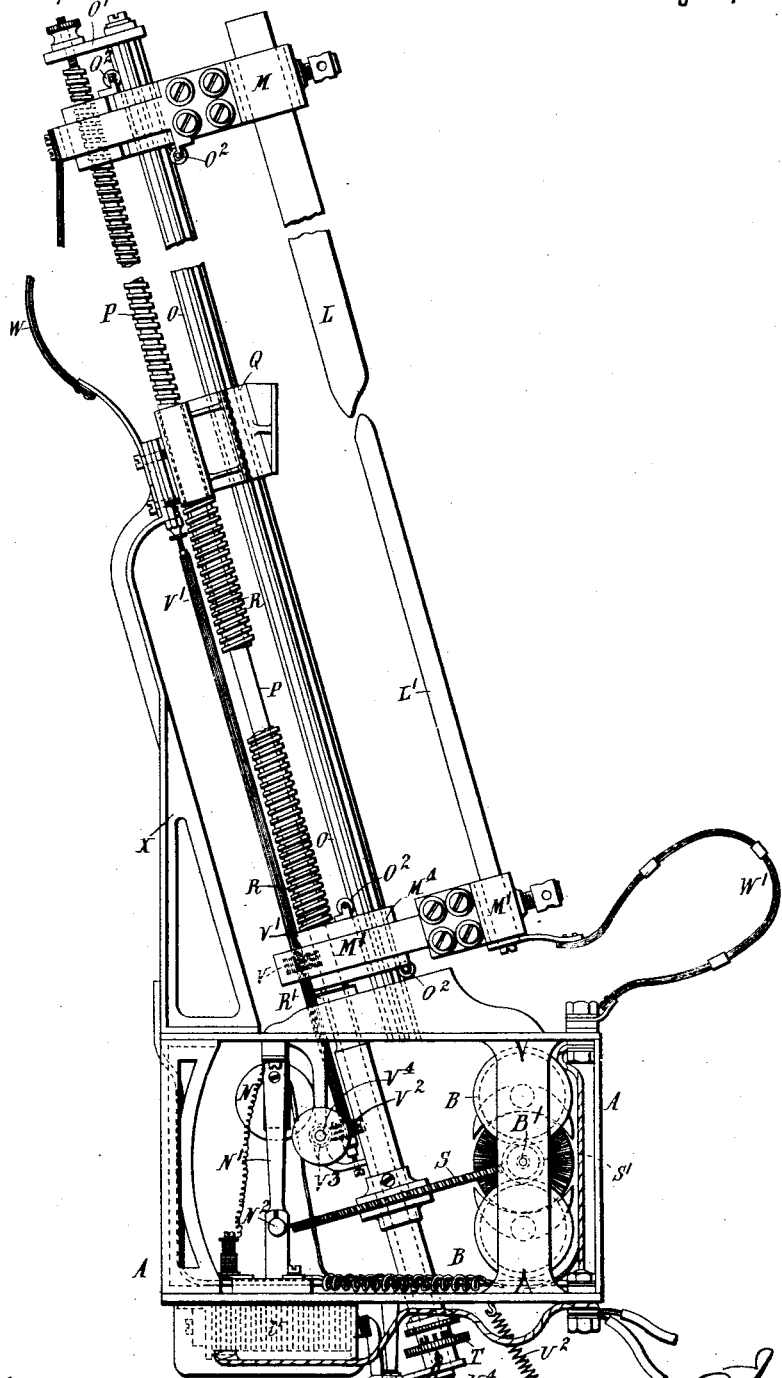
Figure 5:
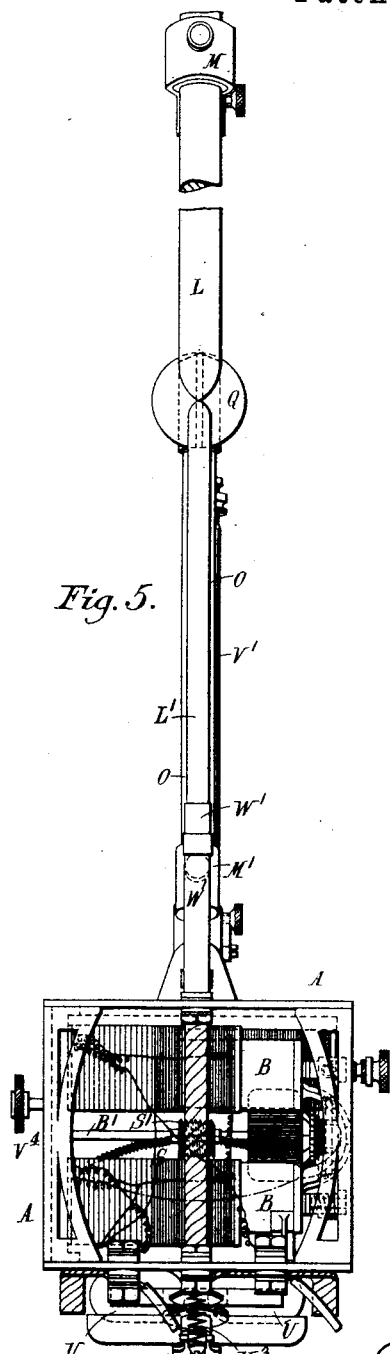
Figure 6:
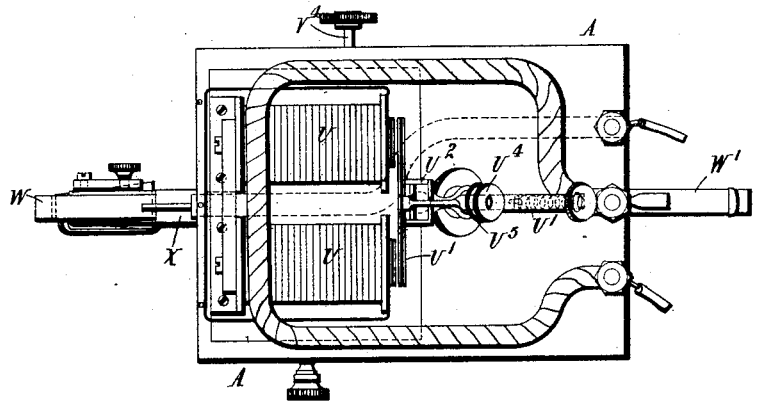
Figure 7:
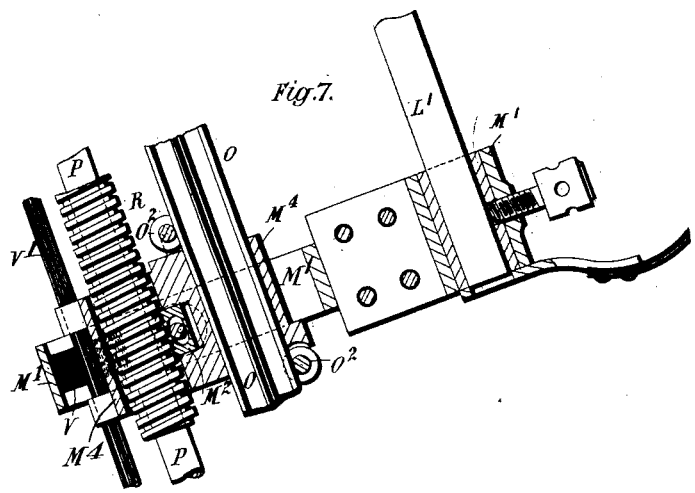
Figure 9:
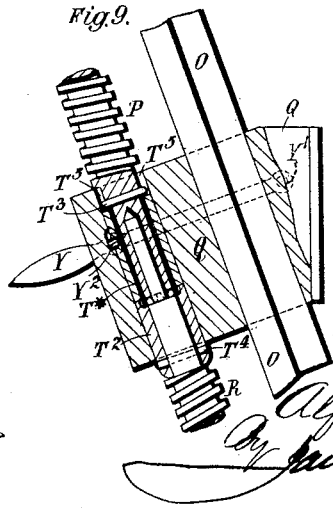
Figure 8:
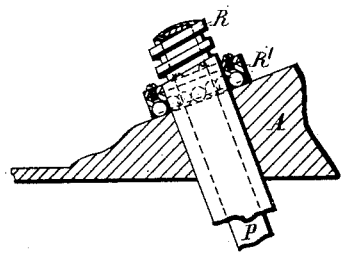
Figure 12:
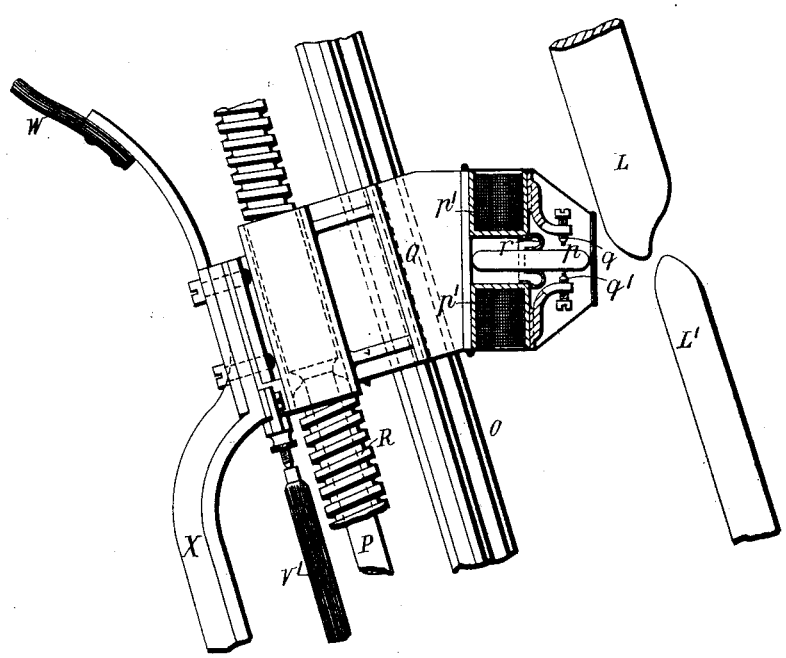
Figure 13:
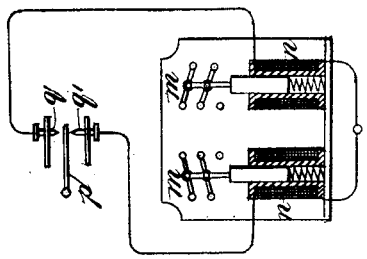
Figure 14:
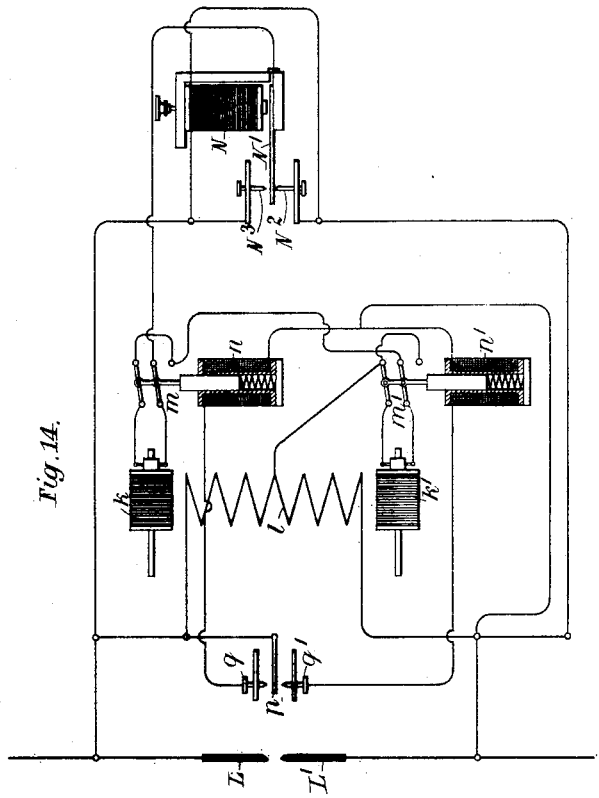
Figure 15:
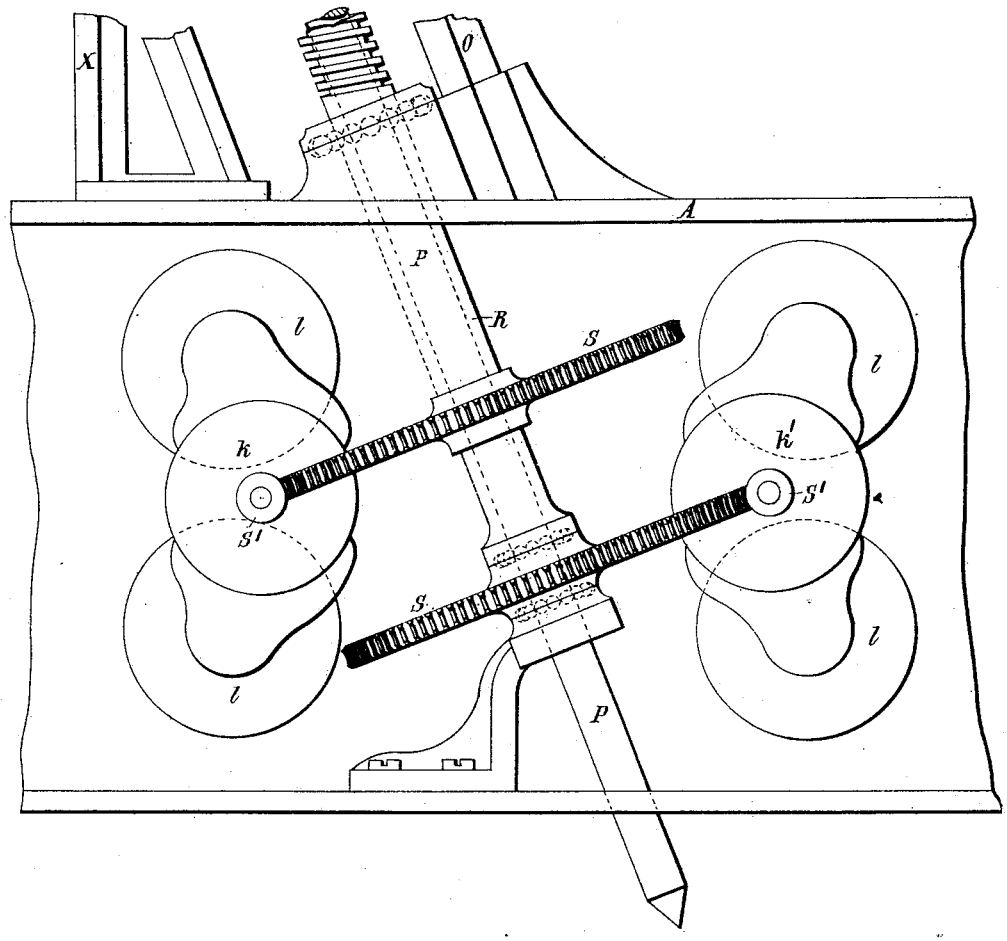

Figure 1 is a diagram illustrating the application of my improvements to that class of arc lamps in which the carbons are operated by a motor controlled by a relay. Fig. 2 is a side elevation showing my improved device for controlling the action of the motor for feeding the carbons. Fig. 3 is a diagram showing the electrical connections with the said motor. Fig. 4 is a side elevation, Fig. 5 a front elevation, and Fig. 6 an under side view, showing one form of my improved arc lamp. Figs. 7 and 8 are vertical central sections drawn to an enlarged scale, showing details of construction Fig. 9 is a vertical central section, also drawn to an enlarged scale, showing a slight modification thereof. Figs. 10, 10ª, and 11 are diagrams illustrating different arrangements of the electrical connections. Fig. 12 is a side elevation partly in section, and Figs. 13 and 14 are diagrams, illustrating an improved device, hereinafter described, for maintaining the arc unifocal. Fig 15 is a side elevation of part of the said device.

Referring to Fig. 1, $a\ a$ are the carbons, $b\ c$ are the coils, and $b'\ c'$ the armatures or tongues of the relays. $d\ d'$ are the contacts of the relays. It will be seen that in the circuit shown there are two lamps in series, one of which lamps is controlled by a relay, the coil $c$ of which is included in a shunt upon the arc, the other lamp being controlled by a relay, the coil $b$ of which is included in the main circuit of the lamp in accordance with my invention. The coil $b$ is of thick wire, while the coil $c$ is of fine wire. The thick-wire coil lamp acts as a governor to the other lamp, absorbing any extra potential in its own arc and shortening its arc if the pressure or potential falls below the normal, the other lamp still keeping the same arc to which it was regulated. $e$ is an electro-magnet, the coil of which is included in the main or lamp circuit. The armature $f$ of this magnet is attached to one end of a lever, which is pivoted at $f'$ and carries at its other end a V-shaped piece $g$, adapted to connect the two contacts $h\ h'$, and thus complete the shunt-circuit. The said armature is acted upon by a spring $j$, which tends to turn it about the pivot $f'$, so as to move the V-shaped piece $g$ away from the contacts $h\ h'$, and thus interrupt the said shunt-circuit. So long as the lamp is in operation the current flowing through the magnet-coil will cause the attraction of the magnet, so that the armature will be held in the position shown in full lines in the drawings. When, however, the current ceases to flow through the carbons, the spring $j$ will draw the armature away from the magnet and move the V-shaped piece $g$ away from the contacts $h\ h'$, thus switching the shunt-coil $c$ out of circuit.

The said improvements are principally designed to be used on parallel circuits of, say, one hundred volts with two lamps in series; but it is also applicable to parallel circuits of higher potential with more lamps in series. In the latter cases I sometimes find it advantageous to use more than one governor-lamp as a regulator arranged in the manner above described when two lamps are used in series. Moreover, it is obvious that I can regulate the burning of other forms of arc lamps by utilizing a similar arrangement of governor-lamp controlled by the main or lamp current in conjunction with a lamp or lamps controlled by a shunt-circuit.

Referring to Figs. 2 and 3, A is the frame, which supports the lamp mechanism. B is the motor. C is the commutator. D D' are the brushes. E is a revolving disk or contact, which is fixed upon the armature-shaft B' of the motor B. F is a movable or oscillating tongue, which is pivoted at F' to a bracket A', attached to the frame A, and which is provided with the contact-springs G G'. H is an electro-magnet included in the main circuit of the lamp, and J is an electro-magnet included in a shunt upon the arc. K is a flexible conductor or brush, which bears against the rotary contact E and serves to conduct the current to the brush D.

The revolving contact or disk E is preferably constructed of insulating material, the periphery thereof being covered with platinum or other refractory metal. The contacts G G' of the movable tongue F are so arranged that one or other of them will be caused to bear lightly against the periphery of the revolving contact E when the tongue F is attracted by the corresponding magnet H or J. The current will then flow in one or the other direction through the armature of the motor, being conveyed through the brush D, the conductor K, the platinum or other metal upon the disk E, and the contact G or G', as the case may be. The tongue F will be oscillated by the action of the magnets H J, so as to make contact between the moving disk E and one or other of the pieces G G', according to whether the magnet in the main circuit or that in the shunt is energized, thus regulating or controlling the direction and duration of the current through the motor, according to the requirements of the lamp.

Referring to Figs. 4, 5, 7, and 11, L L' are the carbons, which are supported in holders M M'. N is the regulating-coil of a relay for controlling the working of the motor. N' is the tongue, and $N^2\ N^3$ are the contacts of the said relay. The carbon-holders M M' are arranged to travel up and down a guide-rod O, (preferably of steel,) firmly secured to the base or frame A of the lamp and inclined at an angle of about twenty degrees to the vertical or at any other suitable angle, or the said guide-rod and the carbons may be arranged horizontally or vertically, if desired.

For effecting the feeding of the carbons by means of the motor B, I provide what I term a "double-threaded screw"—that is to say, a screw having a right-hand thread on one part thereof and a left-hand thread on the other part thereof—so that when it is rotated about its axis in one or the other direction it will move the carbons simultaneously toward or away from each other. This feed-screw is arranged parallel to the guide-rod O and in the same plane with it and with the carbons L L'. The said screw comprises an inner screw-threaded rod P, which is supported at its upper end in a bearing O', secured to the upper extremity of the guide-rod O and which is further supported in a piece or block Q, secured to the said guide-rod O at or near the center thereof. The said feed-screw also comprises a hollow rod or tube R, which is provided with an external screw-thread and is supported in suitable bearings on the frame A and through which extends the lower part of the rod P, the said rod P being so arranged that it can be moved endwise independently of the tube R, for the purpose hereinafter specified.

The tube R is provided with a right-hand screw-thread and the rod P with a left-hand screw-thread, as shown, or vice versa. The tube R is preferably supported by means of a ball-bearing R' (more clearly shown in Fig. 8) upon the top of the frame A, so as to diminish the friction and consequently the power required to rotate the feed-screw. The screw-threaded rod P and the screw-threaded tube R work in half-nuts $M^2$, Fig. 7, in the upper and lower carbon holders, respectively. A worm-wheel S is firmly fixed upon the said tube R and is geared with a worm S', fixed upon the armature-shaft B' of the motor B. The said rod P is, moreover, connected with the tube R by means of a clutch T or in any other convenient manner to insure their rotation together, while permitting their disconnection when necessary, so that either of them can be rotated separately to alter the position or focus of the arc. The half-nuts $M^2$ can be thrown into and out of engagement with the screw-threads on the rod P and tube R by means of cams or eccentrics, as shown in Fig. 7, (or in any other convenient manner,) to permit the movement of the carbon-holders by hand on the guide-rod O independently of the feed-screw when required. Anti-friction rollers $O^2$ are mounted upon the carbon-holders M M' and are adapted to bear against the guide-rod O, so as to facilitate the movements of the said carbon-holder thereon. In some instances I use in place of the said wheels suitable balls held in recesses in the inner surface of the carbon-holders and running in grooves in the guide-rod.

The feed-screw P R is, as above stated, so constructed that the upper half thereof—that is to say, the rod P—is capable of being moved independently of the lower half or tube R. The said rod, which is passed through the tube R, is connected therewith by a pin or stud P', fixed in the said rod and extending through an elongated slot T' on one part of the clutch T, so that the rod P can move longitudinally or endwise relatively to the tube R, but when connected therewith by the clutch must participate in any rotary movement thereof. This capability of independent movement of the upper portion of the screw permits of the raising of the upper carbon L without the aid of the motor B and the consequent striking of the arc in a more expeditious manner than is practicable by the movement of the carbons under the action of the motor. For effecting the striking of the arc when the carbons come into contact with each other I prefer to employ an electro-magnet U, and I find it advantageous to secure this magnet to the under side of the frame A and to attach its armature to one end of a bent lever U', pivoted at $U^2$ to a bracket $A^2$, attached to the said frame. To the other end of this lever is attached one end of a spring $U^3$, the other end of which is attached to the frame A. The rod P rests at its lower end in a recess in the end of a setting-up screw $U^4$, provided with a lock-nut $U^5$.

The coil of the magnet U is included in the main circuit, so that as soon as the carbons touch each other the said magnet will turn the lever U' about its pivot $U^2$, and thus raise the rod P and form the arc. The feeding of the carbons by the motor will then be effected, as required.

I sometimes so arrange the armature of the electro-magnet U relatively to the poles thereof that with the normal current the armature is not fully attracted. Therefore any excess of current will cause the armature to approach more closely and thereby increase the length of the arc. I may, if desired, employ in place of the electro-magnet U a solenoid having a movable core, which is suitably connected with the lever U'.

The above-described arrangement of electro-magnet or solenoid is intended for use in cases where the field-magnets are wound either wholly with fine wire, as hereinafter mentioned with reference to Fig. 11, or partly with thick wire and partly with fine wire, as hereinafter mentioned with reference to Fig. 10. In the latter case I sometimes utilize the current in the thick wire of the field-magnets for effecting the striking of the arc. For this purpose I may employ a movable yoke actuated by the said magnets, the said movable yoke being connected in any convenient manner with the inner rod P. I prefer, however, to place the whole or a portion of the thick wire beneath the lamp and to utilize the current flowing through it for actuating a lever, as above described with reference to the drawings. In this case I can utilize the volts lost in this winding to furnish current for the armature, as hereinafter mentioned with reference to Fig. 10.

To enable the lower-carbon holder M' to be moved or adjusted laterally to regulate the burning of the carbons so as to insure the proper consumption of the same, I construct the said holder in two parts, as shown more clearly in Fig. 7, one of which $M^4$ is arranged to slide freely up and down upon the guide-rod O, the portion M' of the said carbon-holder, which carries the lower carbon L', being free to move laterally to and fro on the part $M^4$. A small rack V is attached to the said sliding portion M' of the holder, and a long pinion or pinion-wire V', supported in suitable bearings, is geared with the said rack, A worm-wheel V², Fig. 4, is firmly fixed upon the said pinion-wire V' at or near its lower extremity and is geared with a worm V³, formed on or firmly secured to a spindle V⁴, supported in suitable bearings in the frame A. This spindle is provided with a milled wheel, by means of which it can be turned by hand from the outside of the lamp to move the part M' in either direction through the said worm V³, worm-wheel V², pinion V', and rack V, and thus effect the lateral adjustment of the lower carbon.

The carbon-holders are suitably insulated from the other parts of the lamp and the current is conducted thereto by means of flexible copper strips W W'.

In some cases I provide for the adjustment of one of the carbons in the arc of a circle to regulate the burning of the carbons, so as to insure the proper consumption thereof. For this purpose I mount the corresponding carbon-holder on a pivot and provide it with another pinion-wire, which is geared with a toothed segment working in slots in the carbon-holder and held by telescopic rods, which permit the relative movement of the parts of the holder for effecting the lateral adjustment of the carbon.

I show in Fig. 9 a different arrangement, in which I connect the screw-threaded rods P and R by means of a clutch arranged within the block Q and composed of two sleeves T* T², adapted to engage with each other by means of teeth formed on the ends of the said sleeves, the latter being connected by pins T³ T⁴ with the said rods P R, respectively. The upper sleeve T* is formed with slots T⁵ to receive the pin T³, so that the said sleeve can be moved up and down relatively to the rod P for the purpose of disconnecting it from and connecting it with the sleeve T. For moving the said sleeve for this purpose I employ a lever Y, pivoted at Y' to the block Q and connected with the other sleeve T* by a pin Y², working in a slot in the said block.

In the form of my improved lamp (shown in Figs. 4 to 8) I prefer to employ a motor such as those of Gramme or Pacinotti, and I sometimes wind the field-magnets of the motor with a thick wire $a$, Fig. 10, carrying the whole or a considerable portion of the main current, and also with a fine wire $b$, Fig. 10, which carries a current shunted from the arc, the armature being wound with small wire of suitable size. The direction and duration of the current in the armature are controlled by a relay, the regulating-coil N of which I prefer to wind as a shunt on the arc.

In the diagram shown in Fig. 10 the regulating-coil N is arranged on one side of the tongue N', and a regulating-coil Z, included in the main circuit, is arranged on the other side thereof. The circuits and connections are so arranged that when the carbons are apart a current flows through the fine wire $b$ on the field-magnets of the motor and also through the regulating-coil N, thus causing the tongue N' of the relay to make contact with the stop or contact-piece N², so as to cause a portion of the current flowing through such portion or portions of the fine wire $b$ as will afford the required potential to be deflected through the armature of the motor in such a manner that the said motor operates to bring the carbons together. As soon as the carbons touch each other the current flows through the thick wire $a$ of the field-magnets, and the striking of the arc is effected either by the movement of one part of the feed-screw independently of the other part thereof, as above described, or in cases where no provision is made for such independent movement of the upper half of the feed-screw the arc is formed as follows, viz: The current flows through the coil Z, and the movable tongue N', being released by the short-circuiting of the regulating-coil N and being attracted by the coil, touches the opposite contact N³, thus causing a portion of the current flowing through the thick wire $a$ of the field to pass through the armature in the reverse direction, the poles of the field still remaining the same. The armature therefore rotates in the reverse direction and draws the carbons apart, thereby forming or striking the arc. When the length of the arc has increased sufficiently, the current again flows through the coil $n$ of the relay, the tongue N' of which is again moved so as to cause the motor to feed the carbons, and these operations being repeated as required effectually regulate the working of the lamp. By these means I am enabled to effect the reversals of the motor with the aid of only two contact-points. It is evident that, if desired, the coil Z may be dispensed with and the tongue N' be held by its spring in contact with the piece N³, as shown in Fig. 11, except when the said tongue is attracted to the contact N² by the coil N.

In some instances I wind the field-magnets, as indicated at $b'$ $b^2$, Fig. 11, with fine wire included in a shunt on the arc, in which case I make use of the arrangement for striking the arc by a magnet in the main circuit, as above described. When the carbons are apart, the current flows through the coil N, which draws the tongue N' up to the contact N², so that a portion of the current flowing through the field is diverted through the armature of the motor, which is thus caused to feed the carbons toward each other. When the carbons touch each other, the main current then strikes the arc. The tongue N', being released, leaves the contact N², and should the arc not be sufficiently long touches the contact N³. A portion of the current flowing through the field is thus caused to pass in the reverse direction through the armature, and the motor being reversed draws the carbons still farther away from each other. The motor is thus reversed as often as required and the working of the lamp properly regulated.

The lamp shown in Figs. 4 to 8 is provided with a long bracket X, of gun-metal or other suitable material, to which is firmly secured the block or piece Q for supporting the feed-screws and through which the current is conducted to the upper carbon. I find it advantageous to combine with this bracket or with a copper rod or other suitable conductor in the lamp a current-indicator, whereby the strength of the current can at any time be readily ascertained. This indicator is conveniently and advantageously constructed with a small magnetic needle, which is suitably pivoted, so that its axis is parallel to the said conductor. The said needle, when no current is flowing, is retained in the zero position by a small hair-spring.

I sometimes place the controlling-relay and the contacts in a box separate from the lamp, being merely connected thereto by the necessary wires. This I do in order to protect the said relay against violent shocks or jars, which are likely to impair the proper working of the lamp.

To provide for maintaining the arc unifocal—that is to say, for keeping the arc always in the same position or focus, notwithstanding any difference in the rapidity of consumption of the carbons—I utilize the attraction for magnetic bodies which, as is well known, is one of the properties of the electric arc. For this purpose I provide the following device: $k$ $k'$, Figs. 14 and 15, are two rotating armatures having field-magnets $l$. One of these armatures is geared to the inner rod P and the other to the outer tube R. These armatures I couple in series and arrange them as a shunt to the field-magnets, as shown clearly in Fig. 14. The direction of current in the armature-circuit is controlled by a relay N with a tongue N' and two contact-points $N^2$ $N^3$. The relay N is included in a shunt to the arc. I introduce into the circuit of each armature a suitable switch $m$ for reversing the direction of the current in the armature independently of the relay N and the contact-points. These reversing-switches are controlled by electro-magnets or solenoids $n$, Fig. 13. A current from any suitable source being sent through one or the other of these electro-magnets or solenoids causes it to attract its plunger, and thus operate the corresponding switch and reverse the current in the corresponding armature.

As shown in Fig. 14, the solenoids $n$ $n'$ are arranged in a shunt about the arc and the current through the said solenoids is controlled by a special device, which consists of a magnetic bar $p$, arranged to move between two contact-pieces $q$ $q'$, Figs. 12 and 13. This magnetic bar, which may be either a permanent magnet or an electro-magnet excited by a small coil $p'$, round which a current is sent from any suitable circuit, is held at one end by a spring or springs $r$, or is pivoted and balanced between the two contacts $q$ $q'$. The said magnetic bar is arranged in a line with the required focus in a horizontal or other suitable position at a convenient distance from the arc. The attraction of the arc for this magnetic bar will cause the free end of the said bar to follow the arc should it leave the desired focus until the said bar is arrested by one or other of the contact-points $q$ $q'$, which are arranged above the said bar. These contact-points and the magnetic bar are included in the circuit of the two electro-magnets or solenoids $n$ $n'$, which control the reversing-switches $m$, so that the movement of the arc from the focus either upward or downward will cause the reversal of the current in one or other of the armatures $k$ $k'$ in such a manner as to bring the arc back to the focus. Evidently this focusing device will only operate when the relay N is allowing the carbons to feed.

The operation is as follows: If we suppose the arc to get below the position required for the focus, the bar $p$ will follow and touch the contact $q'$. One of the electro-magnets or solenoids $n$ is energized and attracts its plunger. This causes the switch $m'$ to turn, and the armatures $k$ $k'$ both rotate in opposite directions as soon as the carbons are allowed to feed. The carbons do not, therefore, approach or recede from each other, but the arc moves up into focus again. As soon as the arc is in focus the bar $p$ leaves the contact-point and the reversing-switch flies back to its normal position, so that the armatures $k$ $k'$ rotate in the same direction, thereby causing the carbons to approach or recede from each other until the arc is shortened or lengthened by the proper amount. The wire of the coil $p'$, surrounding the magnetic bar $p$, I cover with asbestus or other suitable non-inflammable compound, as it is liable to become highly heated. This arrangement is very advantageous when the lamp is required to work without attention.

I claim—

1. In a system of electric-lighting mains arranged for running arc lamps in parallel branches of two in series, the combination of two arc lamps arranged in series between the said mains, one of the said lamps having the regulation of its arc controlled by a coil in series with its arc and the other lamp having its regulating mechanism controlled by a coil in a shunt upon its own arc, substantially as and for the purpose specified.

2. The combination, with an arc lamp whose regulation is controlled by a coil in shunt upon the arc and a switch for completing and interrupting the shunt-circuit and controlled by an electro-magnet in the main circuit of the lamp, of a governor-lamp whose regulation is controlled by a coil in series with its arc, substantially as described.

3. The combination, in a motor arc lamp, of one or more movable contacts controlled by an electro-magnet, and a revolving contact-piece which is rotated by the motor, so as to continually present fresh surfaces to the said movable contacts, substantially as and for the purpose above specified.

4. In an electric-arc lamp, the combination, with an electric motor having its field-magnets wound partly with thick wire included in the main circuit and partly with fine wire included in a shunt on the arc, of a regulating-coil included in another shunt on the arc for controlling the direction and duration of the current in the armature of the said motor, substantially as described.

5. In an electric-arc lamp, the combination, with an electric motor having its field-magnets wound with fine wire included in a shunt on the arc, of a regulating-coil included in a shunt on the arc and another regulating-coil included in the main circuit for controlling the direction and duration of the current in the armature of the said motor, substantially as set forth.

6. In an arc lamp, the combination of a feed-screw formed in two parts, one of which is movable independently of the other, the field-magnet of the motor, which is geared to the feed-screw, said field-magnet being energized by a coil in series with the arc, and a yoke which is so connected to the movable part of the feed-screw that when it is attracted by the said field-magnet the movable part of the feed-screw is moved relatively to the other part thereof, substantially as and for the purpose specified.

7. In an arc lamp, a carbon-holder formed in two parts, in combination with a rack and pinion for adjusting one of the said parts relatively to the other part while maintaining the carbon, so that it always points in the same direction, substantially as set forth.

8. The combination of parts comprising the two rotating armatures for feeding the carbons, the switches for reversing the direction of the current in such armatures, and the magnetic bar in proximity to the arc for controlling the movement of the said switches through the medium of electro-magnets or solenoids, substantially as described, whereby I provide for maintaining the arc unifocal, as above specified.

In testimony whereof I have hereunto signed my name in the presence of two subscribing witnesses.

ALFRED LYSTER SHEPARD.

Witnesses:
DAVID YOUNG,
H. S. HOWARD.